Oct. 21, 1952   R. N. KIRCHER ET AL   2,614,897
MAIN BEARING FOR MULTICRANK ENGINES
Filed March 11, 1950

INVENTORS
RALPH N. KIRCHER
BY WILFORD B. BURKETT

John W. Michael
ATTORNEY

Patented Oct. 21, 1952

2,614,897

UNITED STATES PATENT OFFICE 2,614,897

MAIN BEARING FOR MULTICRANK ENGINES

Ralph N. Kircher, West Bend, and Wilford B. Burkett, Hartford, Wis., assignors to West Bend Aluminum Co., West Bend, Wis., a corporation of Wisconsin Application March 11, 1950, Serial No. 149,118

8 Claims. (Cl. 308—35)

This invention relates to improvements in bearings and particularly to main crank shaft bearings for multi-crank engines.

Engines of this type have frequent application in outboard motors where the crank shaft is normally in vertical position. In such engines it is necessary to prevent any substantial transfer of pressures from one crank case to the other. It is also desirable to support the shaft against axial displacement. Heretofore plain bearings have been used in order to provide a pressure seal between the crank cases. Such bearings are not desirable with high speed engines because of over-heating, relatively high frictional losses, and difficulty in proper lubrication.

It is an object of this invention, therefore, to provide a main bearing which provides a pressure seal between crank cases, receives axial thrust, and carries the radial load with a minimum of frictional loss and generated heat.

This object is obtained by mounting an anti-friction roller-type bearing on a main bearing area of a crank shaft within an outer hollow cylindrical thrust bearing. The ends of the thrust bearing slidably engage bearing surfaces on the cheeks of the crank adjacent such main bearing area. The thrust bearing is secured to the crank case so that it will not have axial movement with respect thereto. The anti-friction roller bearing has an outer steel race which is mounted within the thrust bearing. Needle-type rollers have rolling engagement with such outer race and the main bearing area. Thus, the sliding bearing engagement between the ends of the thrust bearing and the bearing surfaces on the crank cheeks not only prevents axial movement of the crank shaft but also creates a seal preventing the transfer of pressure in any detrimental amounts from one crank case to the other crank case while the anti-friction roller bearing within the thrust bearing takes the radial load with the minimum amount of friction and generated heat.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
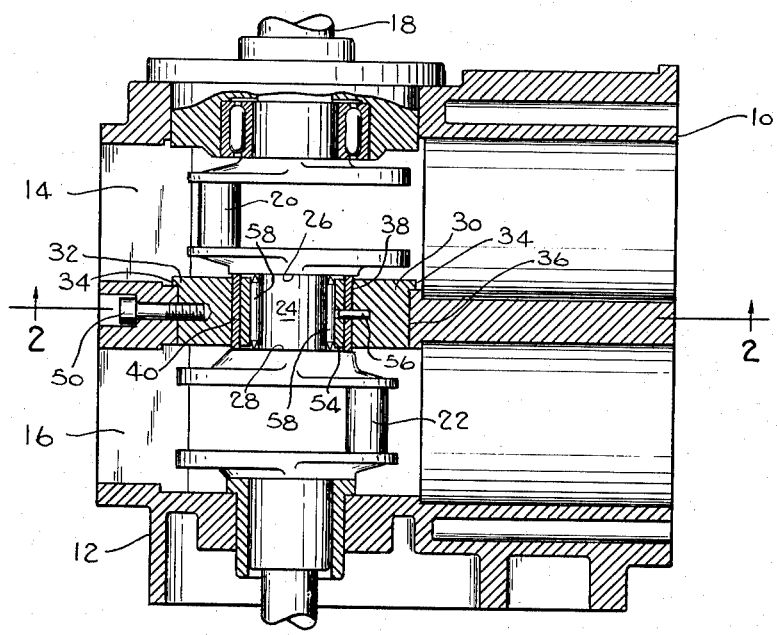
Fig. 1 is a sectional view of an engine cylinder block having two crank cases having between such cases a center main bearing embodying the present invention.
Figure 2:
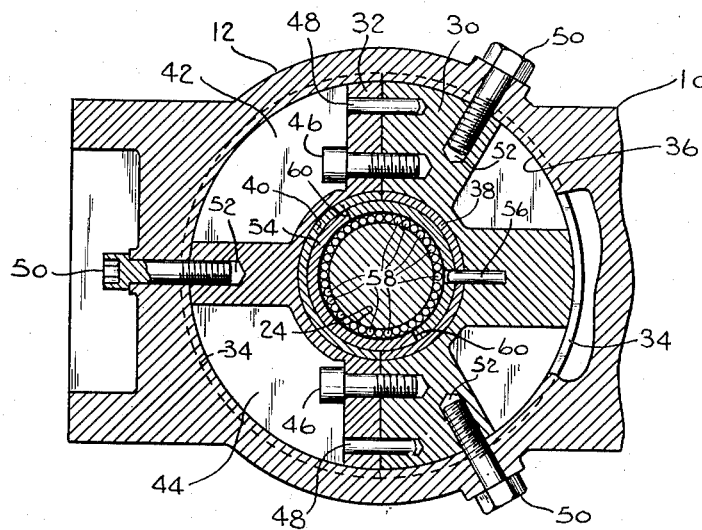
Fig. 2 is an enlarged fragmentary sectional view taken on line 2—2 of Fig. 1.
Figure 3:
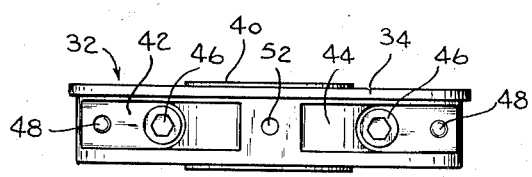
Fig. 3 is a left-hand view in elevation of the bearing cage which mounts the center main bearing between the crank cases.

Referring to the drawing by reference numerals, the main bearing of this embodiment is a center bearing incorporated in a cylinder block 10 suitable for a two cylinder two cycle motor. However, such bearing may be mounted in any engine (two cycle or otherwise) where it is necessary to provide for thrust and radial loads. In this embodiment the housing 12 for the upper and lower crank cases 14 and 16 is cast integral with the block and the crank shaft is inserted axially with the bearings preassembled thereon. The crank cases 14 and 16 are covered in the customary manner after the connecting rod bearings have been assembled to the cranks of the crank shaft. As is the practice well known to those skilled in this art, the crank shaft 18 has two cranks 20 and 22 mounted between crank cheeks and a center main bearing area 24. The crank cheeks adjacent such area are provided with bearing surfaces 26 and 28 which take the thrust load. In this embodiment such bearing surfaces are flat, but they may be conical or cylindrical or any other shape provided there is adequate surface-to-surface contact between such bearing surface and the ends of the thrust bearing.

While in this embodiment the center main bearing is held in a bearing cage secured between the crank cases, such bearing may be mounted directly in a cylinder block which has the crank case made of two parts split along the axis of the crank shaft. The bearing cage has a rear or right half 30 and a front or left half 32. Each half has an outer cylindrical periphery and an upper circumferential flange 34 extending beyond such periphery. With the halves assembled the outer periphery fits snugly within a bored opening 36 between the crank cases 14 and 16 and the lower face of the flange 34 rests against the upper margin of such opening. This properly locates and holds the cage and forms a partition between the crank cases. It has been found satisfactory to make the halves 30 and 32 of die cast aluminum and to cast therein as an insert the respective halves 38 and 40 of a cylindrical bronze thrust bearing. It is recommended that the thrust bearing halves be provided with anchor holes into which the aluminum flows to form a secure key. The front half 32 has two recesses 42 and 44 the bottoms of which provide a seat for clamping bolts 46 and provide space for the insertion of dowels 48. The completely assembled cage is held against dislodgment and rotation with respect to the bored opening 36 by bolts 50 extending radially from the outside of the housing 12 into threaded openings 52 formed in the cage halves. It is essential to this invention that the thrust bearing halves 38 and 40 be longer than the thickness of the cage halves 30 and 32 so that they project therebeyond and slidably engage with the flat bearing surfaces 26 and 28 on the crank cheeks. It is the engagement between the edges of the assembled thrust bearing and such surfaces which takes the thrust load, prevents axial movement of the shaft, and forms a pressure seal preventing any transfer of pressure between the upper and lower crank case.

The anti-friction roller bearing for taking the radial load is mounted within the thrust bearing 38—40 and comprises a hardened steel outer race 54, an inner race formed by the crank shaft bearing area 24, and a plurality of hardened needle-type rollers 58 which have rolling engagement with said races. The outer race 54 is secured within the thrust bearing 38—40 by a pin 56 which passes through such thrust bearing into the material of the rear cage 30 and thus it will not rotate with respect thereto. The outer race 54 and the rollers 58 are somewhat shorter than the thrust bearing 38—40 to provide proper clearance between the flat bearing surfaces 26 and 28. The steel outer race is made in accordance with a method not a part of this invention. It is made in one piece and then broken into two halves at fractured sections designated generally at 60. One half of the outer race is mounted in the rear bearing cage and keyed against rotation by the pin 56.

To assemble the center main bearing on the shaft, the rear half 30 of the bearing cage with the thrust bearing half 38 and half of the outer race are placed adjacent the center main bearing area 24 and the required number of needles 58 are dropped into the space therebetween. The remainder of the needles are then set on the exposed portion of the area 24 and temporarily held in place by a layer of grease or lubricant. The other half of the outer race is then placed over such needles and the fractured sections of the race halves exactly interfitted. Then the front half 32 with its thrust bearing half 40 is assembled to the rear half of the cage. The dowels 48 accurately aline such halves and as bolts 46 are tightly drawn the clamping pressure so developed tightly holds the two halves of the outer race so that such race at the fractured sections assumes a shape and has a surface smoothness identical to that prior to its fracture. Thus the proper bearing tolerances between the center main bearing area 24 and the outer race 54 are accurately re-established as originally designed. After the center main bearing and cage are assembled in the shaft, they are inserted in a well-known manner and the cage fastened against displacement by inserting the bolts 50 from the outside of the housing 12.

The anti-friction needle-type roller bearing takes the radial load without unduly increasing temperature and frictional losses. The thrust or axial load, primarily caused by the weight of the crank shaft and the flywheel, is not as severe as the radial load, and the bearing area between the edges of the bronze thrust bearing 38—40 and the flat bearing surfaces 26—28 is sufficient to take such load without causing any unusual friction. Such thrust load, however, is sufficient to maintain satisfactory bearing contact to have such thrust bearing act as a pressure seal preventing the transfer of pressure between the upper and lower crank cases.

Although only one embodiment of the invention is shown and described herein, it will be understood that this application is intended to cover such changes or modifications as come within the spirit of the invention or scope of the following claims.

We claim:

1. A center main bearing for an engine having a crank shaft with a cylindrical bearing area and crank cheeks with bearing surfaces thereon adjacent said bearing area, comprising a fixed outer cylindrical thrust bearing having edges in bearing engagement with and forming a pressure seal with said surfaces, and an inner anti-friction bearing positioned within said cylindrical bearing and operative between said cylindrical bearing and said bearing area to carry radial loads.

2. A combined thrust and radial bearing for a shaft having a cylindrical bearing area extending between two bearing surfaces one at each end thereof, comprising a fixedly mounted outer cylindrical bearing of relatively soft metal loosely encircling said area and having the edges thereof in sliding engagement with said surfaces to prevent said shaft from having axial movement, and an anti-frictional bearing having a race of relatively hard metal secured within said cylindrical bearing.

3. A bearing as claimed in claim 2 in which said outer cylindrical bearing is comprised of two halves mounted in halves of a bearing cage and said race consists of two members exactly fitted together at fractured sections thereof whereby said race and cylindrical bearing may be assembled on said bearing area between said flat bearing surfaces.

4. A combined thrust and radial bearing for a shaft having a cylindrical bearing area extending between two bearing surfaces one at each end thereof, comprising a fixedly mounted outer cylindrical bearing of relatively soft metal loosely encircling said area and having the edges thereof in sliding engagement with said surfaces to prevent said shaft from having axial movement, and an anti-friction bearing having an outer race of relatively hard metal fixedly secured within said outer cylindrical bearing, said bearing area comprising the inner race for said anti-friction bearing whereby said anti-friction bearing carries the radial load between said shaft and said outer cylindrical bearing.

5. A bearing as claimed in claim 4 in which said outer cylindrical bearing is comprised of two halves mounted in halves of a bearing cage and said race consists of two members exactly fitted together at fractured sections thereof whereby said race and cylindrical bearing may be assembled on said bearing area between said bearing surfaces.

6. A center main bearing for a two crank case engine having a crank shaft with a cylindrical bearing area and a thrust bearing surface at an angle to the axis of said shaft, comprising a bearing cage formed of two halves, each half having secured thereto a half of a hollow cylindrical bearing of relatively soft bearing material, said bearing having an end projecting beyond said cage, said end having sliding contact with said thrust bearing surface, a plurality of needle-like rollers of relatively hard bearing material positioned around said thrust bearing area in rolling contact therewith, and a race of relatively hard bearing material within said hollow cylindrical bearing and encircling said rollers, said race having rolling engagement with said rollers to take radial loads from said shaft, said race being formed of two portions fitted together at fractured sections and held in exact position by pressure from said cage halves.

7. A bearing as claimed in claim 6 in which said cage halves are made of cast aluminum and said halves of said hollow cylindrical bearing are made of bronze and cast as an inset in said cage halves and in which one portion of said race is secured within said hollow cylindrical bearing by a pin extending through said hollow cylindrical bearing into a respective cage half.

8. A combined thrust and radial bearing for a shaft having a cylindrical bearing area extending between two bearing surfaces one at each end thereof, comprising an outer cylindrical bearing of relatively soft metal fixed against longitudinal movement and encircling said area and having the edges thereof in sliding engagement with said surfaces to prevent said shaft from having axial movement, and an anti-frictional bearing having a race of relatively hard metal mounted within said cylindrical bearing.

RALPH N. KIRCHER.
WILFORD B. BURKETT.

REFERENCES CITED

The following references are of record in the file of this patent:

UNITED STATES PATENTS

| Number | Name | Date |
|---|---|---|
| 617,719 | Corver | Jan. 17, 1899 |